(12) United States Patent
Chen

(10) Patent No.: US 12,321,034 B2
(45) Date of Patent: Jun. 3, 2025

(54) OPTICAL LENS AND ELECTRONIC APPARATUS

(71) Applicant: ABILITY ENTERPRISE CO., LTD., New Taipei (TW)

(72) Inventor: Jung-Yao Chen, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 130 days.

(21) Appl. No.: 17/364,515

(22) Filed: Jun. 30, 2021

(65) Prior Publication Data

US 2022/0066127 A1    Mar. 3, 2022

(30) Foreign Application Priority Data

Aug. 31, 2020   (TW) ................................. 109129783

(51) Int. Cl.
*G02B 7/09*     (2021.01)
*G02B 15/14*    (2006.01)
*H04N 23/67*    (2023.01)

(52) U.S. Cl.
CPC ........... *G02B 7/09* (2013.01); *G02B 15/1461* (2019.08); *H04N 23/67* (2023.01)

(58) Field of Classification Search
CPC .................. G02B 7/09; G02B 15/1461; G02B 15/144113; G02B 9/24; G02B 9/26; G02B 9/28; G02B 9/30; G02B 9/42; G02B 13/0045; G02B 13/006; G02B 13/04; G02B 13/06; G02B 13/08; G02B 13/12; G02B 15/14; G02B 9/62; G02B 13/02; G02B 27/06; G02B 9/00; G02B 9/64; G02B 13/00; G02B 27/00; G02B 27/64;
(Continued)

(56) References Cited

U.S. PATENT DOCUMENTS 5,059,007 A  * 10/1991  Tanaka ................. G02B 15/173
                                                     359/676
6,124,983 A  *  9/2000  Yahagi ........... G02B 15/144113
                                                     359/687
(Continued)

FOREIGN PATENT DOCUMENTS

CN         106772964 A      5/2017
CN         111103677 A      5/2020
(Continued)

OTHER PUBLICATIONS

Taiwan Office Action issued by the TIPO on Nov. 7, 2023 for application No. 109129783, 7 pages.
(Continued)

*Primary Examiner* — Thomas K Pham
*Assistant Examiner* — Kuei-Jen L Edenfield
(74) *Attorney, Agent, or Firm* — Innovation Counsel LLP

(57) ABSTRACT

An optical lens, in order from an object side to an image-forming side, includes: a first lens having positive refractive power, a second lens having refractive power, a third lens having refractive power, a fourth lens having negative refractive power, a fifth lens having negative refractive power, a sixth lens having positive refractive power, a seventh lens having negative refractive power, an eighth lens having negative refractive power, a ninth lens having refractive power and a tenth lens having positive refractive power.

6 Claims, 7 Drawing Sheets

(58) Field of Classification Search
CPC . G02B 3/00; G02B 7/02; G02B 19/00; G02B 21/00; G02B 23/00; H04N 23/67; H04N 5/232; H04N 5/225; G03B 30/00
USPC ....... 359/362, 380, 676, 715, 745, 747, 649, 359/650, 668, 670
See application file for complete search history.

(56) References Cited

U.S. PATENT DOCUMENTS

| | | | |
|---|---|---|---|
| 7,362,510 B2* | 4/2008 | Nanjo | G02B 15/144113 359/686 |
| 7,433,584 B2* | 10/2008 | Masui | G02B 15/144113 359/689 |
| 10,107,995 B2 | 10/2018 | Wang et al. | |
| 10,215,969 B2* | 2/2019 | Kawamura | H04N 23/687 |
| 11,378,789 B2* | 7/2022 | Ito | G02B 15/144105 |
| 2014/0300974 A1* | 10/2014 | Lee | G02B 15/144105 359/684 |
| 2015/0124126 A1* | 5/2015 | Yamano | H04N 23/69 359/687 |
| 2015/0241668 A1* | 8/2015 | Nagatoshi | G02B 15/1431 359/683 |

FOREIGN PATENT DOCUMENTS

| | | |
|---|---|---|
| JP | 2008-145584 A | 6/2008 |
| TW | 201044003 A | 12/2010 |
| TW | 201135278 A | 10/2011 |

OTHER PUBLICATIONS

Taiwan Office Action issued by the TIPO on Jun. 11, 2024 for application No. 109129783, 5 pages.
Chinese Office Action corresponding to Application No. 202010927726. 5, dated on Aug. 13, 2024, 8 pages.

* cited by examiner

| Lens | Surface number | Curvature radius (mm) | Thickness (mm) | Refractive index | Abbe number | Effective diameter (mm) | Focal length (mm) |
|---|---|---|---|---|---|---|---|
| L11 | S1 | 58.4 | 1.0 | 1.9 | 31.3 | 24.0 | -81.7 |
|  | S2 | 32.4 | 0.0 |  |  | 23.5 |  |
| L12 | S3 | 32.4 | 4.0 | 1.5 | 81.6 | 23.5 | 55.1 |
|  | S4 | -171.7 | 0.4 |  |  | 23.3 |  |
| L2 | S5 | 27.5 | 3.7 | 1.5 | 81.6 | 22.2 | 70.1 |
|  | S6 | 123.3 | 19.5 |  |  | 21.4 |  |
| L3 | S7 | 21.6 | 6.3 | 2.0 | 25.5 | 18.6 | 19.6 |
|  | S8 | -195.4 | 0.1 |  |  | 15.2 |  |
| L4 | S9 | -140.9 | 0.7 | 1.8 | 29.8 | 15.0 | -17.8 |
|  | S10 | 16.0 | 1.4 |  |  | 12.8 |  |
| L5 | S11 | 218.5 | 0.7 | 1.7 | 39.7 | 12.6 | -18.7 |
|  | S12 | 11.7 | 2.9 |  |  | 11.4 |  |
|  | STO | ∞ | 1.5 |  |  | 7.5 |  |
| L61 | S13 | -15.2 | 5.1 | 1.7 | 54.7 | 7.8 | 16.4 |
|  | S14 | -7.7 | 0.0 |  |  | 9.4 |  |
| L62 | S15 | -7.7 | 1.0 | 1.6 | 56.0 | 9.4 | -33.1 |
|  | S16 | -13.5 | 1.4 |  |  | 10.0 |  |
| L7 | S17 | -9.5 | 0.6 | 1.6 | 40.5 | 10.0 | -48.0 |
|  | S18 | -14.4 | 22.81 |  |  | 10.4 |  |
| L8 | S19 | 50.5 | 1.1 | 1.9 | 31.3 | 11.6 | -29.0 |
|  | S20 | 17.1 | 0.1 |  |  | 11.6 |  |
| L9 | S21 | 14.5 | 2.8 | 1.7 | 54.7 | 12.0 | 44.7 |
|  | S22 | 24.0 | 0.1 |  |  | 12.0 |  |
| L10 | S23 | 19.8 | 3.4 | 1.6 | 71.7 | 12.0 | 17.4 |
|  | S24 | -17.7 | 2.5 |  |  | 12.4 |  |
| F | S25 | ∞ | 0.3 | 1.5 | 64.2 | 8.1 |  |
|  | S26 | ∞ | 0.4 |  |  | 8.0 |  |
| C | S27 | ∞ | 0.5 | 1.5 | 64.2 | 8.0 |  |
|  | S28 | ∞ | 0.5 |  |  | 7.9 |  |
|  | IMA | ∞ |  |  |  | 7.8 |  |

FIG. 3

| Lens | Surface number | Curvature radius (mm) | Thickness (mm) | Refractive index | Abbe number | Effective diameter (mm) | Focal length (mm) |
|---|---|---|---|---|---|---|---|
| L11 | S1 | 58.4 | 1.0 | 1.9 | 31.3 | 24.0 | -81.7 |
|  | S2 | 32.4 | 0.0 |  |  | 23.5 |  |
| L12 | S3 | 32.4 | 4.0 | 1.5 | 81.6 | 23.5 | 55.1 |
|  | S4 | -171.7 | 0.4 |  |  | 23.3 |  |
| L2 | S5 | 27.5 | 3.7 | 1.5 | 81.6 | 22.2 | 70.1 |
|  | S6 | 123.3 | 2.4 |  |  | 21.4 |  |
| L3 | S7 | 21.6 | 6.3 | 2.0 | 25.5 | 18.6 | 19.6 |
|  | S8 | -195.4 | 0.1 |  |  | 15.2 |  |
| L4 | S9 | -140.9 | 0.7 | 1.8 | 29.8 | 15.0 | -17.8 |
|  | S10 | 16.0 | 1.4 |  |  | 12.8 |  |
| L5 | S11 | 218.5 | 0.7 | 1.7 | 39.7 | 12.6 | -18.7 |
|  | S12 | 11.7 | 19.2 |  |  | 11.4 |  |
|  | STO | ∞ | 1.5 |  |  | 7.5 |  |
| L61 | S13 | -15.2 | 5.1 | 1.7 | 54.7 | 7.8 | 16.4 |
|  | S14 | -7.7 | 0.0 |  |  | 9.4 |  |
| L62 | S15 | -7.7 | 1.0 | 1.6 | 56.0 | 9.4 | -33.1 |
|  | S16 | -13.5 | 1.4 |  |  | 10.0 |  |
| L7 | S17 | -9.5 | 0.6 | 1.6 | 40.5 | 10.0 | -48.0 |
|  | S18 | -14.4 | 3.48 |  |  | 10.4 |  |
| L8 | S19 | 50.5 | 1.1 | 1.9 | 31.3 | 11.6 | -29.0 |
|  | S20 | 17.1 | 0.1 |  |  | 11.6 |  |
| L9 | S21 | 14.5 | 2.8 | 1.7 | 54.7 | 12.0 | 44.7 |
|  | S22 | 24.0 | 0.1 |  |  | 12.0 |  |
| L10 | S23 | 19.8 | 3.4 | 1.6 | 71.7 | 12.0 | 17.4 |
|  | S24 | -17.7 | 22.66 |  |  | 12.4 |  |
| F | S25 | ∞ | 0.3 | 1.5 | 64.2 | 8.1 |  |
|  | S26 | ∞ | 0.4 |  |  | 8.0 |  |
| C | S27 | ∞ | 0.5 | 1.5 | 64.2 | 8.0 |  |
|  | S28 | ∞ | 0.5 |  |  | 7.9 |  |
|  | IMA | ∞ |  |  |  | 7.8 |  |

FIG. 4

|     | S23            | S24            |
| --- | -------------- | -------------- |
| K   | 0              | 0              |
| A2  | 0              | 0              |
| A4  | -6.776079e-005 | 2.6848252e-006 |
| A6  | -8.0842729e-007| -7.0071402e-007|
| A8  | 2.15896e-011   | 1.2542806e-008 |
| A10 | 0              | -5.6548162e-010|
| A12 | 0              | 1.3442459e-011 |
| A14 | 0              | -1.2015592e-013|

FIG. 5

| | OL |
|---|---|
| $F_w$ (mm) | 31.07 |
| $F_t$ (mm) | 93.44 |
| $F_{G1}$ (mm) | 50.20 |
| $F_{G2}$ (mm) | -25.72 |
| $|F_{G1}/F_{G2}|$ | 1.95 |
| $F_{G3}$ (mm) | 808.39 |
| $F_{G4}$ (mm) | 23.45 |
| TTL (mm) | 85.00 |
| Fno | 2.80 |
| Y' (mm) | 3.90 |
| $FOV_w$ (°) | 14.34 |
| $FOV_t$ (°) | 4.78 |
| TTL/$F_w$ | 2.74 |
| TTL/$F_t$ | 0.91 |
| $F_w$/Y' | 7.97 |
| $F_t$/Y' | 24 |
| $F_t$/$F_w$ | 3.00 |
| R1 (mm) | 58.4 |
| R2 (mm) | 32.4 |
| R23 (mm) | 19.8 |
| R24 (mm) | -17.7 |
| (R1-R2)/(R1+R2) | 0.29 |
| (R23+R24)/(R23-R24) | 0.06 |

FIG. 6

OPTICAL LENS AND ELECTRONIC APPARATUS

This application claims the benefit of Taiwan application Serial No. 109129783, filed Aug. 31, 2020, the subject matter of which is incorporated by reference herein in its entirety.

TECHNICAL FIELD

The invention relates in general to an optical lens and an electronic apparatus, and more particularly to an optical lens and an electronic apparatus with a thin and light weight, a high zoom magnification and a good imaging quality.

BACKGROUND

Optical lenses may be divided into the fixed-focus lens and the zoom lens, of which the zoom lens is provided with the advantage of variable focal length, making its applicability more extensive. In order to achieve high zoom magnification, low distortion and high imaging quality of the zoom lens, a number of lenses are required to be used in the zoom lens in most cases, so that it is hard to reduce the volume of the zoom lens. If the number of lenses is reduced, it is impossible to achieve the performance requirements of the zoom lens. Therefore, there is an urgent need to propose a novel optical lens which may simultaneously meet the requirements of thinness and light weight, high zoom magnification and high imaging quality.

SUMMARY

The invention is directed to an optical lens and an electronic apparatus with the characteristics of thinness and light weight, high zoom magnification, low distortion and high imaging quality.

According to one embodiment, an optical lens is provided. The optical lens, in order from an object side to an image-forming side, includes a first lens having positive refractive power, a second lens having refractive power, a third lens having refractive power, a fourth lens having negative refractive power, a fifth lens having negative refractive power, a sixth lens having positive refractive power, a seventh lens having negative refractive power, an eighth lens having negative refractive power, a ninth lens having refractive power and a tenth lens having positive refractive power.

According to another embodiment, an optical lens is provided. The optical lens, in order from an object side to an image-forming side, includes a first lens group, a second lens group, a third lens group and a fourth lens group. The first lens group has positive refractive power, and includes a first lens and a second lens. The second lens group has negative refractive power, and includes a third lens, a fourth lens and a fifth lens. The third lens group has positive refractive power, and includes a sixth lens and a seventh lens. The fourth lens group has positive refractive power, and includes an eighth lens, a ninth lens and a tenth lens.

According to still another embodiment, an optical lens is provided. The optical lens, in order from an object side to an image-forming side, includes a first lens having refractive power, a second lens having refractive power, a third lens having refractive power, a fourth lens having negative refractive power, a fifth lens having negative refractive power, a sixth lens having refractive power, a seventh lens having negative refractive power, an eighth lens having negative refractive power, a ninth lens having refractive power and a tenth lens having positive refractive power. At least one of the first lens and the sixth lens is a cemented lens.

According to a further embodiment, an electronic apparatus is provided. The optical apparatus includes an optical lens, a control module and a driving module. The optical lens has a plurality of lenses. The control module is electrically connected to the optical lens. The driving module is electrically connected to the control module and the optical lens. The optical lens may capture a plurality of images. The control module may calculate a focus information of the optical lens in accordance with a target in the images. The driving module may drive the optical lens to focus in accordance with the focus information.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3 lists each lens parameter of the optical lens at the telescopic end shown in FIG. 1 according to one embodiment of the present invention.

FIG. 4 lists each lens parameter of the optical lens at the wide-angle end shown in FIG. 2 according to one embodiment of the present invention.

FIG. 5 lists aspheric coefficients of the mathematic equation of the aspheric lenses of the optical lens of FIG. 1 according to one embodiment of the present invention.

FIG. 6 lists the specific parameters of the optical lens of FIG. 1.

DETAILED DESCRIPTION

Figure 1:
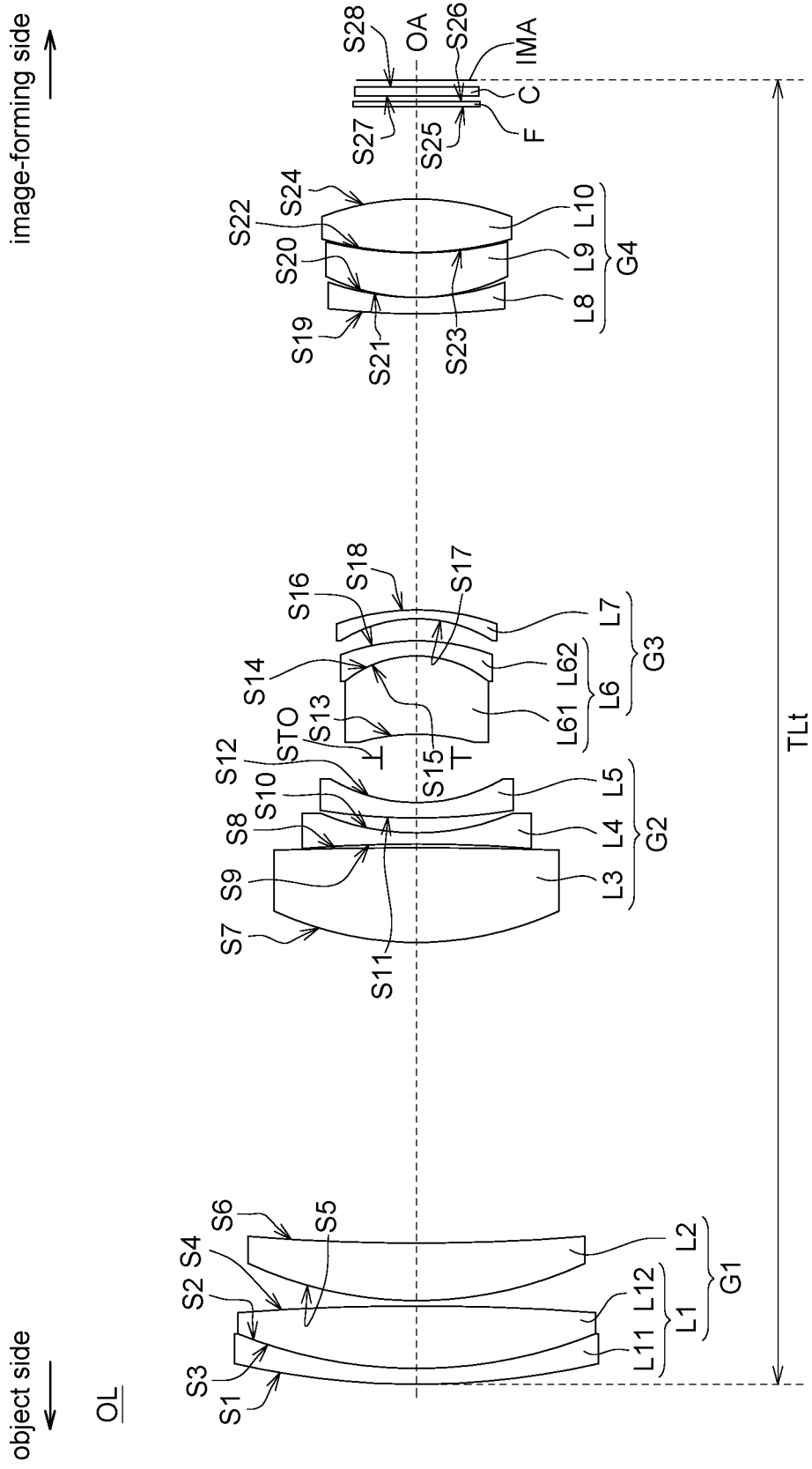
FIG. 1 is a schematic diagram illustrating the position of each lens of an optical lens when the optical lens is at a telescopic end according to one embodiment of the present invention.

Each embodiment of the present invention will be described in detail hereinafter, and illustrated with the accompanying drawings. In addition to these detailed descriptions, the present invention may be broadly practiced in other embodiments, and any substitution, modification, or equivalent variation of any of the described embodiments is included within the scope of the present invention, subject to the scope of the claims thereafter. In the description of the specification, many specific details are provided in order to give the reader a more complete understanding of the present invention; however, the present invention may be practiced with the omission of some or all of these specific details. In addition, well-known steps or elements are not described in detail to avoid unnecessary limitations of the present invention. Identical or similar elements in the drawings will be indicated by identical or similar reference numerals. In particular, the drawings are only for illustrative purposes and do not represent the actual size or number of elements, unless they are otherwise indicated.

Figure 2:
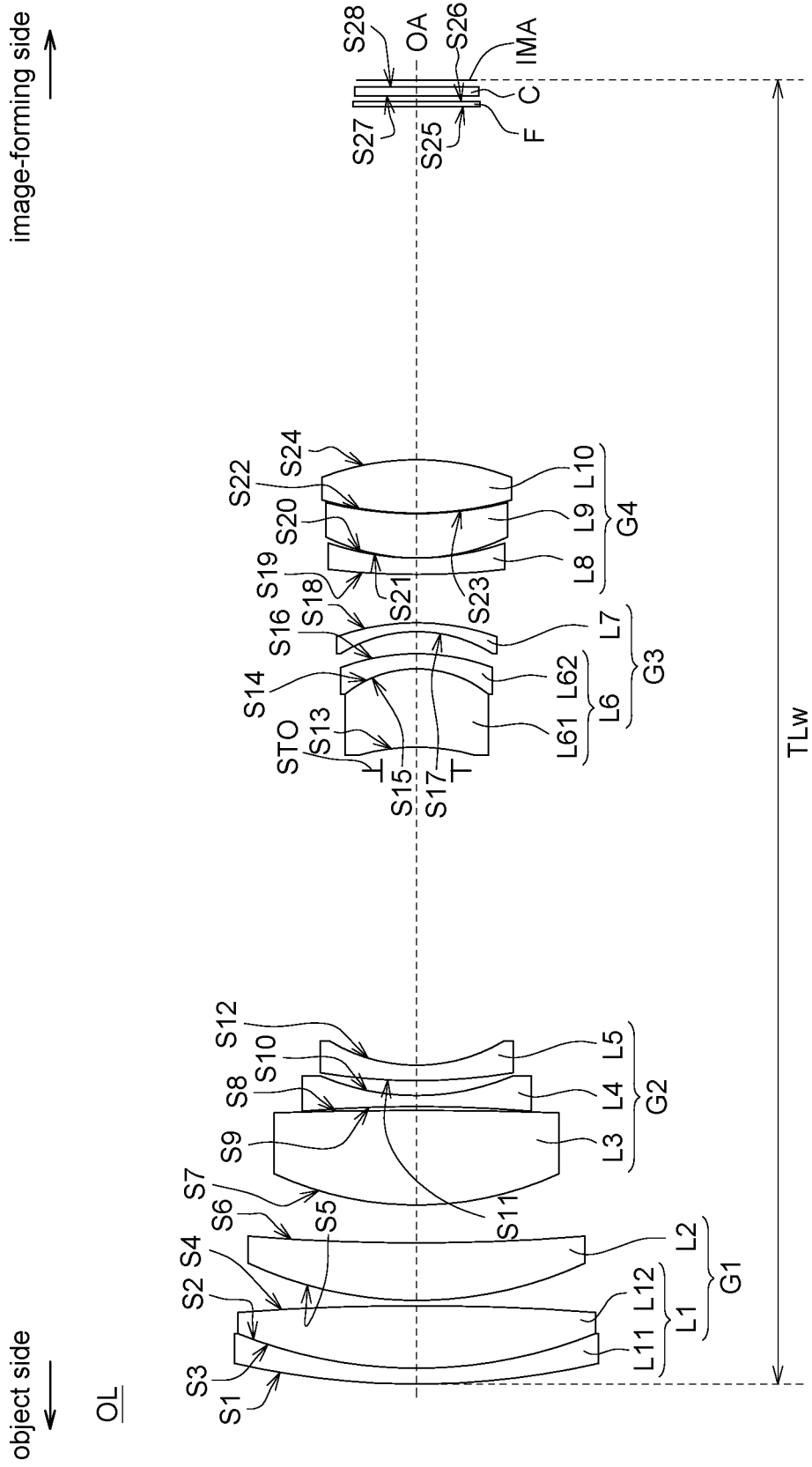
FIG. 2 is a schematic diagram illustrating the position of each lens of the optical lens when the optical lens of FIG. 1 is at a wide-angle end.

FIG. 1 is a schematic diagram illustrating the position of each lens of an optical lens OL when the optical lens OL is at a telescopic end according to one embodiment of the present invention. FIG. 2 is a schematic diagram illustrating the position of each lens of the optical lens OL when the optical lens OL of FIG. 1 is at a wide-angle end. In order to show the features of the embodiments, only the structures related to the embodiments of the present invention are shown and the rest of the structures are omitted.

The optical lens OL may be a zoom lens, which may be applied to a device capable of image projection or image capture, the device including but not limited to a handheld computer system, a handheld communication system, an aerial camera, a sports camera lens, a camera lens for vehicle, a surveillance system, an internet protocol camera, a digital camera, a digital video camera or a projector.

Referring to FIG. 1 and FIG. 2, the left side is the object side and the right side is the image-forming side. The light beam may penetrate each lens of the optical lens OL from the object side and may be imaged on an imaging plane IMA on the image-forming side. The optical lens OL, in order from the object side to the image-forming side, may include a first lens L1, a second lens L2, a third lens L3, a fourth lens L4, a fifth lens L5, a sixth lens L6, a seventh lens L7, an eighth lens L8, a ninth lens L9 and a tenth lens L10. The above ten lenses may be arranged along an optical axis OA. The first lens L1, the second lens L2, the third lens L3, the fourth lens L4, the fifth lens L5, the sixth lens L6, the seventh lens L7, the eighth lens L8, the ninth lens L9 and the tenth lens L10 may have refractive power, respectively.

In one embodiment, the first lens L1 may have positive refractive power, the second lens L2 may have positive refractive power, the third lens L3 may have positive refractive power, the fourth lens L4 may have negative refractive power, the fifth lens L5 may have negative refractive power, the sixth lens L6 may have positive refractive power, the seventh lens L7 may have negative refractive power, the eighth lens L8 may have negative refractive power, the ninth lens L9 may have positive refractive power, and the tenth lens L10 may have positive refractive power.

In one embodiment, the first lens L1 may include a first sub-lens L11 and a second sub-lens L12; in another embodiment, the sixth lens L6 may include a third sub-lens L61 and a fourth sub-lens L62. The first sub-lens L11, the second sub-lens L12, the third sub-lens L61 and the fourth sub-lens L62 may have refractive power, respectively.

In one specific embodiment, the first sub-lens L11 may have negative refractive power; the second sub-lens L12 may have positive refractive power; the third sub-lens L61 may have positive refractive power; the fourth sub-lens L62 may have negative refractive power.

In one embodiment, the first lens L1 may be a cemented lens, that is, the first sub-lens L11 and the second sub-lens L12 may be cemented together to form the first lens L1; in another embodiment, the sixth lens L6 may be a cemented lens, that is, the third sub-lens L61 and the fourth sub-lens L62 may be cemented together to form the sixth lens L6. In another embodiment, the first lens L1 has refractive power greater than that of the sixth lens L6.

In one embodiment, the lens length is defined as the distance between an object-side surface S1 of the first lens L1 and the imaging plane IMA. TTL is the lens length of the optical lens OL. TLt is the lens length of the optical lens OL at the telescopic end. TLw is the lens length of the optical lens OL at the wide-angle end. The optical lens OL may satisfy the condition of TLt=TLw.

In one specific embodiment, the optical lens OL may satisfy the condition of TTL=TLt=TLw. That is, during the zooming process of the optical lens OL, the lens length of the optical lens OL remains unchanged.

In one specific embodiment, the optical lens OL may satisfy at least one of the following conditions: 70 mm≤TTL, 75 mm≤TTL, 80 mm≤TTL, TTL≤90 mm, TTL≤95 mm and TTL≤100 mm.

In one embodiment, Ft is the focal length of the optical lens OL at the telescopic end. Fw is the focal length of the optical lens OL at the wide-angle end. The optical lens OL may satisfy at least one of the following conditions: 1.5≤Ft/Fw, 2≤Ft/Fw, 2.5≤Ft/Fw, 2.7≤Ft/Fw, Ft/Fw≤3.3, Ft/Fw≤3.5 and Ft/Fw≤4.

In one embodiment, the focal length of the optical lens OL at the telescopic end may satisfy at least one of the following conditions: 80 mm≤Ft, 85 mm≤Ft, 90 mm≤Ft, Ft≤95 mm, Ft≤100 mm, Ft≤110 mm, Ft≤115 mm and Ft≤120 mm.

In one embodiment, the focal length of the optical lens OL at the wide-angle end may satisfy at least one of the following conditions: 20 mm≤Fw, 25 mm≤Fw, 30 mm≤Fw, Fw≤35 mm, Fw≤40 mm and Fw≤45 mm.

In one embodiment, the optical lens OL at the telescopic end may satisfy at least one of the following conditions: 0.75≤TTL/Ft, 0.8≤TTL/Ft, 0.9≤TTL/Ft, TTL/Ft≤0.95, TTL/Ft≤1, TTL/Ft≤1.1, TTL/Ft≤1.2 and TTL/Ft≤1.5.

In one embodiment, the optical lens OL at the wide-angle end may satisfy at least one of the following conditions: 2≤TTL/Fw, 2.5≤TTL/Fw, TTL/Fw≤3, TTL/Fw≤3.3 and TTL/Fw≤3.5.

In one embodiment, the light beam incident to the optical lens OL may be converged to the imaging plane IMA. Y' is the image height on the imaging plane IMA. The optical lens OL at the wide-angle end may satisfy at least one of the following conditions: 5≤Fw/Y', 5.5≤Fw/Y', 6.5≤Fw/Y', 7≤Fw/Y', 7.5≤Fw/Y', Fw/Y'≤8.2, Fw/Y'≤9, Fw/Y'≤10 and Fw/Y'≤12.

In one embodiment, the optical lens OL at the telescopic end may satisfy at least one of the following conditions: 20<Ft/Y', 22≤Ft/Y', 23.5≤Ft/Y', Ft/Y'≤24.5, Ft/Y'≤30 and Ft/Y'<35.

Furthermore, in one embodiment, the first sub-lens L11 of the first lens L1 has a refractive index of N11 and an Abbe number of V11; the second sub-lens L12 of the first lens L1 has a refractive index of N12 and an Abbe number of V12; the second lens L2 has a refractive index of N2 and an Abbe number of V2; the third lens L3 has a refractive index of N3 and an Abbe number of V3; the fourth lens L4 has a refractive index of N4 and an Abbe number of V4; the fifth lens L5 has a refractive index of N5 and an Abbe number of V5; the third sub-lens L61 of the sixth lens L6 has a refractive index of N61 and an Abbe number of V61; the fourth sub-lens L62 of the sixth lens L6 has a refractive index of N62 and an Abbe number of V62; the seventh lens L7 has a refractive index of N7 and an Abbe number of V7; the eighth lens L8 has a refractive index of N8 and an Abbe number of V8; the ninth lens L9 has a refractive index of N9 and an Abbe number of V9; the tenth lens L10 has a refractive index of N10 and an Abbe number of V10. The optical lens OL may satisfy at least one of the following conditions: N11>N12, N11>N2, N3>N4, N3>N5, N61>N62, N61>N7, N8>N9, N8>N10, V12>V11, V2>V11, V5>V4, V5>V3, V62>V8, V7>V8, V10>V9 and V10>V8.

In one embodiment, R1 is a curvature radius of the object-side surface S1 of the first sub-lens L11, and R2 is a curvature radius of an image-side surface S2 of the first sub-lens L11. The optical lens OL may satisfy at least one of the following conditions: 0≤|(R1−R2)/(R1+R2)|, 0.1≤|(R1−R2)/(R1+R2)|, 0.2≤|(R1−R2)/(R1+R2)|, 0.25≤|(R1−R2)/(R1+R2)|, |(R1−R2)/(R1+R2)|≤0.3, |(R1−R2)/(R1+R2)|≤0.35, |(R1−R2)/(R1+R2)|≤0.5, |(R1−R2)/(R1+R2)|≤0.7 and |(R1−R2)/(R1+R2)|<1.

Specifically, in one embodiment, the optical lens OL may further satisfy at least one of the following conditions: 0≤(R1−R2)/(R1+R2), 0.1≤(R1−R2)/(R1+R2), 0.2≤(R1−R2)/(R1+R2), 0.25≤(R1−R2)/(R1+R2), (R1−R2)/(R1+R2)≤0.3, (R1−R2)/(R1+R2)≤0.35, (R1−R2)/(R1+R2)≤0.5, (R1−R2)/(R1+R2)≤0.7 and (R1−R2)/(R1+R2)<1.

In one embodiment, R23 is a curvature radius of an object-side surface S23 of the tenth lens L10, and R24 is a curvature radius of an image-side surface S24 of the tenth lens L10. The optical lens OL may satisfy at least one of the following conditions: 0≤|(R23+R24)/(R23−R24)|, 0.01≤|(R23+R24)/(R23−R24)|, 0.03≤|(R23+R24)/(R23−R24)|, 0.05≤|(R23+R24)/(R23−R24)|, |(R23+R24)/(R23−R24)|≤0.07, |(R23+R24)/(R23−R24)|≤0.085, |(R23+R24)/(R23−R24)|≤0.1, |(R23+R24)/(R23−R24)|≤0.15 and |(R23+R24)/(R23−R24)|≤0.2.

Specially, in one embodiment, the optical lens OL may satisfy at least one of the following conditions: 0≤(R23+R24)/(R23−R24), 0.01≤(R23+R24)/(R23−R24), 0.03≤(R23+R24)/(R23−R24), 0.05≤(R23+R24)/(R23−R24), (R23+R24)/(R23−R24)≤0.07, (R23+R24)/(R23−R24)≤0.085, (R23+R24)/(R23−R24)≤0.1, (R23+R24)/(R23−R24)≤0.15 and (R23+R24)/(R23−R24)≤0.2.

In one embodiment, the first lens L1, the second lens L2, the third lens L3, the fourth lens L4, the fifth lens L5, the sixth lens L6, the seventh lens L7, the eighth lens L8, the ninth lens L9 and the tenth lens L10 may respectively be a spherical lens or an aspheric lens.

Specifically, the object-side surface and the image-side surface of each spherical lens are spherical surfaces; each aspheric lens has at least one aspheric surface, that is, the object-side surface and/or the image-side surface of the aspheric lens are/is the aspheric surface(s). And, each of the aspheric surfaces may satisfy the following mathematic equation:

$$Z = \left[ \frac{(C \times Y^2)}{1 + \sqrt{1 - (K+1)C^2 y^2}} \right] + \sum (A_i \times Y^i)$$

Z is the coordinate in the direction of the optical axis OA, and the direction in which light propagates is designated as positive; $A_2$, $A_4$, $A_6$, $A_8$ and $A_{10}$ are aspheric coefficients; K is coefficient of quadratic surface; C is reciprocal of R (C=1/R); R is the curvature radius; Y is the coordinate in a direction perpendicular to the optical axis OA, in which the upward direction away from the optical axis OA is designated as positive. In addition, each of the parameters or the coefficients of the equation of each aspheric lens may be designated respectively to determine the focal length of each aspheric lens.

In one specific embodiment, the first lens L1 to the tenth lens L10 are spherical lenses; in another specific embodiment, the tenth lens L10 is an aspheric lens. In still another specific embodiment, the first sub-lens L11 and the second sub-lens L12 of the first lens L1, and the third sub-lens L61 and the fourth sub-lens L62 of the sixth lens L6 are spherical lenses.

Furthermore, in one embodiment, the first lens L1 to the tenth lens L10 may respectively be a glass lens made of a glass material or a plastic lens made of a plastic material. In one specific embodiment, the first lens L1 to the tenth lens L10 are glass lenses, but the present invention is not limited thereto. In another specific embodiment, at least one of the first lens L1 to the tenth lens L10 is a plastic lens.

Further, the material of the plastic lens may include, but not limit to, polycarbonate, cyclic olefin copolymer (e.g. APEL), polyester resins (e.g. OKP4 or OKP4HT) and so on, or a mixture and/or a compound material including at least one of the above-mentioned three materials.

Referring to FIG. 1 and FIG. 2, the object-side surfaces S1, S11, S19 of the first sub-lens L11 of the first lens L1, the fifth lens L5 and the eighth lens L8 may be convex surfaces protruding toward the object side, having positive refractive rate; the image-side surfaces S2, S12, S20 may be concave surfaces recessed toward the object side, having positive refractive rate. The first sub-lens L11, the fifth lens L5 and the eighth lens L8 may respectively be a lens having negative refractive power, the lens including but not limited to any one of a convex-concave lens, a glass lens or a plastic lens, and a spherical lens or an aspheric lens having negative refractive power, or a combination thereof.

The object-side surfaces S3, S7, S23 of the second sub-lens L12 of the first lens L1, the third lens L3 and the tenth lens L10 may be convex surfaces protruding toward the object side, having positive refractive rate; the image-side surfaces S4, S8, S24 may be convex surfaces protruding toward the image-forming side, having negative refractive rate. The second sub-lens L12, the third lens L3 and the tenth lens L10 may respectively be a lens having positive refractive power, the lens including but not limited to any one of a biconvex lens, a glass lens or a plastic lens, and a spherical lens or an aspheric lens having positive refractive power, or a combination thereof.

The object-side surfaces S5, S21 of the second lens L2 and the ninth lens L9 may be convex surfaces protruding toward the object side, having positive refractive rate; the image-side surfaces S6, S22 may be concave surfaces recessed toward the object side, having positive refractive rate. The second lens L2 and the ninth lens L9 may respectively be a lens having positive refractive power, the lens including but not limited to any one of a convex-concave lens, a glass lens or a plastic lens, and a spherical lens or an aspheric lens having positive refractive power, or a combination thereof.

The object-side surface S9 of the fourth lens L4 may be a concave surface recessed toward the image-forming side, having negative refractive rate; the image-side surface S10 may be a concave surface recessed toward the object side, having positive refractive rate. The fourth lens L4 may be a lens having negative refractive power, the lens including but not limited to any one of a biconcave lens, a glass lens or a plastic lens, and a spherical lens or an aspheric lens having negative refractive power, or a combination thereof.

The object-side surface S9 of the fifth lens L5 may be a concave surface recessed toward the image-forming side, having negative refractive rate; the image-side surface S10 of the fifth lens L5 may be a concave surface recessed toward the object side, having positive refractive rate. In one specific embodiment, the fifth lens L5 may be a lens having negative refractive power, the lens including but not limited to any one of a biconcave lens, a glass lens or a plastic lens, and a spherical lens or an aspheric lens having negative refractive power, or a combination thereof.

The object-side surface S13 of the third sub-lens L61 of the sixth lens L6 may be a concave surface recessed toward the image-forming side, having negative refractive rate; the image-side surface S14 may be a convex surface protruding toward the image-forming side, having negative refractive rate. The third sub-lens L61 may be a lens having positive refractive power, the lens including but not limited to any one of a concave-convex lens, a glass lens or a plastic lens, and a spherical lens or an aspheric lens having positive refractive power, or a combination thereof.

The object-side surfaces S15, S17 of the fourth sub-lens L62 of the sixth lens L6 and the seventh lens L7 may be concave surfaces recessed toward the image-forming side, having negative refractive rate; the image-side surfaces S16, S18 may be convex surfaces protruding toward the image-forming side, having negative refractive rate. The fourth sub-lens L62 and the seventh lens L7 may respectively be a lens having negative refractive power, the lens including but not limited to any one of a concave-convex lens, a glass lens or a plastic lens, and a spherical lens or an aspheric lens having negative refractive power, or a combination thereof.

In one embodiment, the optical lens OL may further include a stop STO; in another embodiment, an image capturing unit (not shown) may be further disposed on the imaging plane IMA for photo-electrically converting light beams passing through the optical lens OL. The stop STO may be arranged on the object side of the first lens L1, arranged in any interval between any two of the first lens L1 to the tenth lens L10, or arranged between the tenth lens L10 and the imaging plane IMA. In one specific embodiment, the stop STO is arranged between the fifth lens L5 and the sixth lens L6, but the present invention is not limited thereto.

Furthermore, the optical lens OL may further include a filter F and/or a protection film C. In one embodiment, the filter F may be arranged between the tenth lens L10 and the imaging plane IMA. In one specific embodiment, the filter F may be an IR filter; in another embodiment, the protection film C may be arranged between the filter F and the imaging plane IMA, and a filter film (not shown) may be further formed on the protection film C; in still another embodiment, only the protection film C integrating the functions of protecting the image capturing unit and filtering the infrared light may be used.

FIG. 3 lists each lens parameter of the optical lens OL at the telescopic end shown in FIG. 1 according to one embodiment of the present invention. FIG. 4 lists each lens parameter of the optical lens OL at the wide-angle end shown in FIG. 2 according to one embodiment of the present invention.

FIG. 3 and FIG. 4 respectively lists the parameters including the curvature radius, the thickness, the refractive index, the Abbe number (coefficient of chromatic dispersion), the effective diameter, the focal length and so on of each lens. The surface numbers of the lenses are sequentially ordered from the object side to the image-forming side. For example, "STO" stands for the stop STO, "S1" stands for the object-side surface S1 of the first sub-lens L11 of the first lens L1, "S2" stands for the image-side surface S2 of the first sub-lens L11 of the first lens L1, . . . , "S25" and "S26" respectively stand for the object-side surface S25 and the image-side surface S26 of the filter F, "S27" and "S28" respectively stand for the object-side surface S27 and the image-side surface S28 of the protection film C, and so on. In addition, the "thickness" stands for the distance between an indicated surface and an adjacent surface close to the image-forming side. For example, the "thickness" of the object-side surface S1 is the distance between the object-side surface S1 and the image-side surface S2 of the first sub-lens L11; the "thickness" of the image-side surface S2 is the distance between the image-side surface S2 of the first sub-lens L11 and the object-side surface S3 of the second sub-lens L12 of the first lens L1.

Referring to FIG. 1 to FIG. 4, the first lens L1 stays in the same position when the optical lens OL is at the wide-angle end and the telescopic end; however, during the zooming process of the optical lens OL, the first lens L1 may move on the optical axis OA or be stationary, rather than being limited to the same position.

FIG. 5 lists aspheric coefficients of the mathematic equation of the aspheric lenses of the optical lens OL of FIG. 1 according to one embodiment of the present invention. If the object-side surface S23 and the image-side surface S24 of the tenth lens L10 of the optical lens OL are aspheric surfaces, each of the aspheric coefficients for the mathematic equation of the aspheric lenses may be listed as indicated in FIG. 5.

Further, referring to FIG. 1 and FIG. 2, in one embodiment, the optical lens OL may be defined as a first lens group G1, a second lens group G2, a third lens group G3 and a fourth lens group G4. The first lens group G1 may include the first lens L1 and the second lens L2; the second lens group G2 may include the third lens L3, the fourth lens L4 and the fifth lens L5; the third lens group G3 may include the sixth lens L6 and the seventh lens L7; the fourth lens group G4 may include the eighth lens L8, the ninth lens L9 and the tenth lens L10. In one specific embodiment, the first lens group G1 may have positive refractive power, the second lens group G2 may have negative refractive power, the third lens group G3 may have positive refractive power, and the fourth lens group G4 may have positive refractive power.

Furthermore, in one specific embodiment, the first lens group G1, the second lens group G2, the third lens group G3 and the fourth lens group G4 of the optical lens OL may shift along the optical axis OA between the telescopic end and wide-angle end during the zooming process; in another specific embodiment, the position of the first lens group G1 remains unchanged during the zooming process; in still another embodiment, the stop STO may move along the optical axis OA with the movement of the third lens group G3 during the zooming process, but the present invention is not limited thereto.

FIG. 6 lists the specific parameters of the optical lens OL of FIG. 1, including the focal length of the optical lens OL at the wide-angle end (Fw), the focal length of the optical lens OL at the telescopic end (Ft), the focal length of the first lens group G1 ($F_{G1}$), the focal length of the second lens group G2 ($F_{G2}$), the focal length of the third lens group G3 ($F_{G3}$), the focal length of the fourth lens group G4 ($F_{G4}$), the distance between the object-side surface S1 of the first lens L1 and the imaging plane IMA (TTL), the f-number (Fno), the image height (Y'), the field of view of the optical lens OL at the wide-angle end (FOVw), the field of view of the optical lens OL at the telescopic end (FOVt), the curvature radii of the object-side surfaces S1, S23 and the image-side surfaces S2, S24 at the optical axis OA (R1, R23, R2 and R24), and the values of the relations for the above parameters.

Moreover, in one embodiment, the optical lens OL may satisfy at least one of the following conditions: 1.2≤|FG1/FG2|, 1.5≤|FG1/FG2|, 1.7≤|FG1/FG2|, 1.9≤|FG1/FG2|, |FG1/FG2|≤2, |FG1/FG2|≤2.2 and |FG1/FG2|≤2.5.

Figure 7:
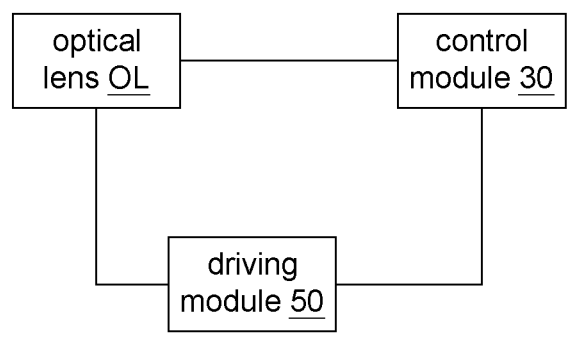
FIG. 7 shows a schematic diagram of an electronic apparatus according to one embodiment of the present invention.

FIG. 7 shows a schematic diagram of an electronic apparatus 100 according to one embodiment of the present invention. Referring to FIG. 1, FIG. 2 and FIG. 7, the electronic apparatus 100 includes the optical lens OL, a control module 30 and a driving module 50. The control module 30 is electrically connected to the optical lens OL, and the driving module 50 is electrically connected to the control module 30 and the optical lens OL.

The optical lens OL may successively capture a plurality of images and transmit the images to the control module 30. At least two of the images contain a target, which may be a person, a human face, an animal, an object pre-designated by the user or a subject automatically selected by control module 30, but the present invention is not limited thereto. The control module 30 calculates a focus information of the optical lens in accordance with the target in the images. The focus information may include the respective positions of the first lens L1, the second lens L2, the third lens L3, the fourth lens L4, the fifth lens L5, the sixth lens L6, the seventh lens L7, the eighth lens L8, the ninth lens L9 and the tenth lens L10 on the optical axis OA. Afterwards, the driving module 50 drives the optical lens OL to focus in accordance with the focus information, so that the first lens L1 to the tenth lens L10 move to their respective focus positions according to the focus information. In one specific embodiment, the optical lens OL continues to capture images, the control module 30 continues to update the focus information in accordance with the latest images, and the driving module 50 continues to drive the optical lens OL to the focus position with the updated focus information.

As can be seen from the above embodiments, the optical lens provided in the present invention may have the characteristics of thinness and light weight, high zoom magnification, low distortion and high imaging quality.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. An optical lens, being a zoom lens which zooms between a telescopic end and a wide-angle end, the optical lens, in order from an object side to an image-forming side, consisting of:
   a first lens having refractive power, the first lens being a cemented lens which comprising a first sub-lens and a second sub-lens;
   a second lens having refractive power;
   a third lens having refractive power;
   a fourth lens having negative refractive power;
   a fifth lens having negative refractive power;
   a sixth lens having refractive power;
   a seventh lens having negative refractive power;
   an eighth lens having negative refractive power;
   a ninth lens having refractive power; and
   a tenth lens having positive refractive power, wherein there is a distance between the seventh lens and the eighth lens, TTL is a lens length of the optical lens, Ft is a focal length of the optical lens at the telescopic end, Fw is a focal length of the optical lens at the wide-angle end, and the optical lens satisfies at least one of the following conditions: 80 mm≤Ft≤120 mm and 20 mm≤Fw≤45 mm.

2. The optical lens according to claim 1, wherein TLt being a lens length of the optical lens at a telescopic end, TLw being a lens length of the optical lens at a wide-angle end, and the optical lens satisfies at least one of the following conditions: 70 mm≤TTL≤100 mm, TLt=TLw and TLt=TLw=TTL.

3. The optical lens according to claim 1, wherein the optical lens satisfies at least one of the following conditions: 0.75≤TTL/Ft≤1.5, 2≤TTL/Fw≤3.5 and 1.5≤Ft/Fw≤4.

4. The optical lens according to claim 1, wherein Y' is an image height of the optical lens, and the optical lens satisfies at least one of the following conditions: 5≤Fw/Y'≤12 and 20≤Ft/Y'≤35.

5. The optical lens according to claim 1, wherein the sixth lens is a cemented lens which comprises a third sub-lens and a fourth sub-lens, the first sub-lens has a refractive index of N11 and an Abbe number of V11, the second sub-lens has a refractive index of N12 and an Abbe number of V12, the second lens has a refractive index of N2 and an Abbe number of V2, the third lens has a refractive index of N3 and an Abbe number of V3, the fourth lens has a refractive index of N4 and an Abbe number of V4, the fifth lens has a refractive index of N5 and an Abbe number of V5, the third sub-lens has a refractive index of N61 and an Abbe number of V61, the fourth sub-lens has a refractive index of N62 and an Abbe number of V62, the seventh lens has a refractive index of N7 and an Abbe number of V7, the eighth lens has a refractive index of N8 and an Abbe number of V8, the ninth lens has a refractive index of N9 and an Abbe number of V9, the tenth lens has a refractive index of N10 and an Abbe number of V10, and the optical lens satisfies at least one of the following conditions: N11>N12, N11>N2, N3>N4, N3>N5, N61>N62, N61>N7, N8>N9, N8>N10, V12>V11, V2>V11, V5>V4, V5>V3, V62>V8, V7>V8, V10>V9 and V10>V8.

6. The optical lens according to claim 1, wherein $R^1$ is a curvature radius of an object-side surface of a lens that is the first one at the object side, R2 is a curvature radius of an image-side surface of the lens that is the first one at the object side, R23 is a curvature radius of an object-side surface of the tenth lens, R24 is a curvature radius of an image-side surface of the tenth lens, and the optical lens satisfies at least one of the following conditions: 0≤|(R1−R2)/(R1+R2)|<1 and 0≤|(R23+R24)/(R23−R24)|≤0.2.

* * * * *